United States Patent [19]
Koke

[11] Patent Number: 5,306,155
[45] Date of Patent: Apr. 26, 1994

[54] CREATIVE WRITING BOOK

[76] Inventor: Joseph Koke, 245A Old Mill Rd., St. James, N.Y. 11780

[21] Appl. No.: 980,740

[22] Filed: Nov. 24, 1992

[51] Int. Cl.⁵ .................... B43L 1/12; G09B 11/00
[52] U.S. Cl. .................... 434/410; 434/162; 281/44
[58] Field of Search .............. 434/156, 162, 165, 167, 434/363, 410; 283/63.1, 36; 281/44

[56] References Cited

U.S. PATENT DOCUMENTS

| | | |
|---|---|---|
| 259,950 | 6/1882 | Van Hoevenbergh ........ 283/63.1 X |
| 2,728,997 | 1/1956 | Gross .................... 434/167 |
| 2,812,183 | 9/1954 | Schiff .................... 283/63.1 X |
| 3,579,871 | 5/1971 | Eddington ................ 434/410 |
| 3,704,338 | 11/1972 | Shore . |
| 3,758,693 | 9/1973 | Ebert . |
| 3,775,868 | 12/1973 | Moore . |
| 4,063,369 | 12/1977 | Hart . |
| 4,176,473 | 12/1979 | Rae . |
| 4,597,743 | 7/1986 | Becker et al. ............ 446/71 |
| 4,650,426 | 3/1987 | Brigance ................ 434/322 |
| 4,678,206 | 7/1987 | Leahan .................. 281/44 |
| 4,896,888 | 1/1990 | Owen .................... 273/240 |
| 4,909,542 | 3/1990 | Marks ................... 281/15.1 |
| 4,943,088 | 7/1990 | Wada .................... 281/39 |
| 5,080,590 | 1/1992 | Frisque ................. 434/88 |
| 5,100,154 | 3/1992 | Mullins ................. 273/429 |
| 5,102,338 | 4/1992 | Kapiloff ................ 434/162 |
| 5,111,224 | 5/1992 | Spector ................. 354/125 |

FOREIGN PATENT DOCUMENTS 0736191 6/1943 Fed. Rep. of Germany ..... 283/63.1

Primary Examiner—Gene Mancene
Assistant Examiner—Cindy A. Cherichetti
Attorney, Agent, or Firm—Alfred M. Walker

[57] ABSTRACT

A book is provided to teach and encourage writing skills which includes a picture printed on each leaf of a multi-leaved tear-off pad of identical leaves in each bundle of pages. The picture page is without words but has space in which the learner, typically a child, will generate writing to form a story which the learner imagines from viewing the picture. The multiple leaves, each having an identical picture, provide for the learner to tear off the top picture when a story has been written by the learner. Having a pad of identical pictures in each bundle of leaves provides the learner with a plurality of opportunities to re-formulate his or her written story, or to write a variety of different stories based upon the same picture. The sheets which have been written upon and then torn off from the picture pad will comprise a portfolio of the learner's educational progress. The teaching book is comprised of a number of such picture pads bound together to form a larger aggregate tear-off pad.

12 Claims, 10 Drawing Sheets

CREATIVE WRITING BOOK

FIELD OF THE INVENTION

The present invention provides a book to teach and encourage writing skills. The book includes a picture pad having a plurality of pages, each page having a picture thereon, and each page having no text upon it, as well as a blank space for a child user to inscribe creative text to imaginatively explain and give meaning to the pictures presented on each page.

The user fills in the title and user's name on a cover sheet. Then on an introduction page, the user fills in the preferred names of characters depicted pictorially on the introduction page. The subsequent pages have pictures of characters interacting, with spaces provided to fill in the story line created by the user. The user follows the pictures sequentially to guide the user to an ultimate conclusion, using proper spelling and grammar, with appropriate punctuation. Preferably, the pages are selectively removable, so that new pages are provided underneath the original written-on pages, for subsequent use of the book on later occasions. The completed pages may be skipped to form a book which may be submitted to a teacher for evaluation.

Use of the present invention encourages creativity and use of language and improving writing skills in young children.

BACKGROUND OF THE INVENTION

Various patents have utilized books as learning aids in promoting language skills.

For example, U.S. Pat. No. 3,704,338 of Shore describes a book with pictures. Underneath the pictures are provided slits with which playing piece blocks with letters affixed thereon are placed to create words. However, Shore does not provide for a plurality of pages wherein each completed page may be removed to create a permanent text.

U.S. Pat. No. 3,775,868 of Moore provides a base board with slots for geometrically shaped blocks. Moore does not entail the use of words with pictures.

U.S. Pat. No. 4,063,369 of Hart describes a book without pictures or words wherein a child selects various graphic pictorial pictures, such as a pumpkin, trees, owls or buildings to assemble a picture design on each page. Hart does not encourage the user to write words with the pictures. It is designed for pre-school children.

U.S. Pat. No. 4,176,473 of Rae provides a book with removable figurines to be inserted within slots provided in thick pages of a book. The words of a text to accompany the pictures are pre-printed upon the pages, so that the user does not use any creativity in developing a written text.

U.S. Pat. No. 4,597,743 of Becker describes a multi-leafed book which is provided on wheels, in the shape of a vehicle, such as a fire truck. It does not involve the encouragement of creative writing of a child.

U.S. Pat. No. 4,650,426 of Brigance discloses a loose leaf book wherein each page has a plurality of different geographic panels portions corresponding to differing subject matters, such that answers are revealed underneath each panel portion having questions thereon. Brigance does not teach the use of a plurality of pages with pictures to encourage creative writing.

U.S. Pat. No. 3,758,693 of Ebert a book with magnetic pages having pictorial maps depicted thereon, so that a child can move a playing piece such as an automobile, throughout selective roadway portions of the maps.

U.S. Pat. No. 4,896,888 of Owen describes an ocean yacht racing game in which a weather book is used in conjunction with a playing board to move yacht playing pieces in response to the weather depicted in each chosen page of the weather book.

U.S. Pat. No. 4,909,542 of Marks describes a three dimensional book in the shape of a soft animal.

U.S. Pat. No. 4,943,088 of Wada provides a book with pictures. A space is provided for a user to write words on the pages with an erasable, water soluble ink. Wada does not involve the permanent inscription on a page of a plurality of pages so that a set of pages with writing may be preserved. Wada does not provide for a sequential group of wordless pages upon which a child writes his or her own story. In fact, text is provided on each page in Wada, and the spaces are provided for the child to write or scribble other comments. Wada therefore does not teach a picture book without words, wherein the pictures are sequentially and strategically placed to encourage a child to write a story from the hints given in the pictures.

U.S. Pat. No. 5,080,590 of Frisque describes a book with tracing pages to trace images underneath transparent foil tracing pages.

U.S. Pat. No. 5,111,224 of Spector describes a photo album used in conjunction with a camera wherein a user writes text underneath the photographic pictures selected by the user. However, Spector does not teach the use of a preselected pictorial story line to encourage a child to write a story from the introduction through the climax to a conclusion, in an orderly manner which allows creative input from the child.

OBJECTS OF THE INVENTION

It is an object of the present invention to provide a book to teach and encourage children writing skills.

It is a further object to provide a book with a plurality of pages wherein each complete page may be removed to create a permanent text.

It is a further object to provide a picture book with a space for a child to write a sequential text upon the pages with words.

It is still another object to provide a book which encourages a child to write words in association with a preselected pictorial story line.

It is a further object to provide a writing educational aid which encourages creativity in writing texts.

It is yet another object to provide a picture book with a plurality of leaves for each page, so that the book may be re-used with the same pictorial story line.

It is yet another object to provide sequential story book without words, wherein the pictures are sequentially and strategically placed to encourage a child to write a story from the visual hints given throughout the pictorial story, in an orderly manner which also allows for creative input from the child.

It is a further object to present a story book with multiple-leaf pages, the pictorial story presented on subsequent pages, after a child has had an opportunity on preceding attempts to write words to accompany the pictures.

It is yet another object to improve over the disadvantages of the prior art.

Other objects may be come apparent from the description of the drawings and the appended claims.

SUMMARY OF THE INVENTION

The present invention provides a book to teach and encourage writing skills, including a picture pad having a plurality of pages, each page having an identical picture thereon, and each page having no text upon it, each page further having a blank space for a user to inscribe creative text to imaginatively explain and give meaning to the picture thereon.

The pad pages are capable of being torn off from the pad to permit a user to inscribe differing text on a succession of pages which all have identical pictures. The differing inscriptions permit the user to practice and improve creative writing skills by varying and expanding upon previously inscribed text. The sheets which have been written upon and then torn-off from the picture pad display a portfolio of the user's educational progress.

The book comprises a plurality of page bundles, such that respective page bundles each further include a plurality of leaves wherein the leaves in each bundle bear an identical picture without text, and wherein each respective page bundle bear a unique picture not found in any other page bundle.

It is proposed in another embodiment, that a book may have more than one story, wherein a first group of pages includes one story, and another set of pages underneath the first group of pages includes a second story, and so forth, so that one book volume may have a compedium of multiple short stories.

In a preferred embodiment, a book is provided to teach and encourage writing skills, including a picture pad having a plurality of double-leaf pages, each respective double-leaf page including a top leaf and a bottom leaf. The double leaf page including a pressure sensitive writing surface capable of producing an image on the bottom leaf in response to the pressure of a writing instrument being applied to the top leaf. The double leaf pages bear an identical picture in register on the top leaf and on the bottom leaf. The top and bottom leaf have no text and the top leaf and the bottom leaf further have space for a user to inscribe creative text to imaginatively explain and give meaning to the picture thereon.

The pad pages of this embodiment are being capable of being torn off from the pad to permit a user to inscribe differing text from page leaf to page leaf on a succession of pages which all have identical pictures. The differing inscriptions permit the user to practice and improve creative writing skills by varying and expanding upon previously inscribed text and the sheets which have been written upon and then torn-off from the picture pad display a portfolio of the user's educational progress.

A stiff flat insert may be placed underneath the pad page to be written on, to prevent successive pressure sensitive pad pages from being inadvertently spoiled by a user's writing pressure. The stiff flat insert is capable of preventing user writing pressure from inadvertently spoiling pressure sensitive pad pages below the one being written upon.

In this embodiment, the book includes a plurality of picture pads, and the respective picture pads each include a plurality of page bundles, each having a plurality of page leaves, wherein the pages leaves in each picture page bundle bear an identical picture without text, and wherein each respective picture page bundle bears a unique picture not found in any other picture page bundle.

Alternatively, each picture in the story sequence may be provided with sequential graphic indicator symbols. The symbols appear on respective picture pages, wherein respective individual graphic indicator symbols are associated with particular pictures in a story sequence. The respective graphic indicator symbols vary in sequence with the story picture sequence, for indicating to the user the relative chronological position in the story of the picture with which the symbol is associated.

The sequential indicator symbols may be geometric shapes, such as circles. The geometric shapes grow in size, the smallest geometric shape appearing on the first picture in the picture story sequence and the largest geometric shape appearing on the last picture in the picture story sequence.

The sequential indicator symbols may also be fanciful shapes, such as stars, clouds, etc. The fanciful shapes grow in size, the smallest fanciful shape appearing on the first picture in the picture story sequence and the largest fanciful shape appearing on the last picture in the picture story sequence.

The sequential indicator symbols may also be fanciful characters, wherein the fanciful characters grow in size, the smallest fanciful character appearing on the first picture in the picture story sequence and the largest fanciful character appearing on the last picture in the picture story sequence.

DESCRIPTION OF THE DRAWINGS

For clarity, the thin pages are not drawn to scale.

DETAILED DESCRIPTION OF THE DRAWINGS

Figure 1:
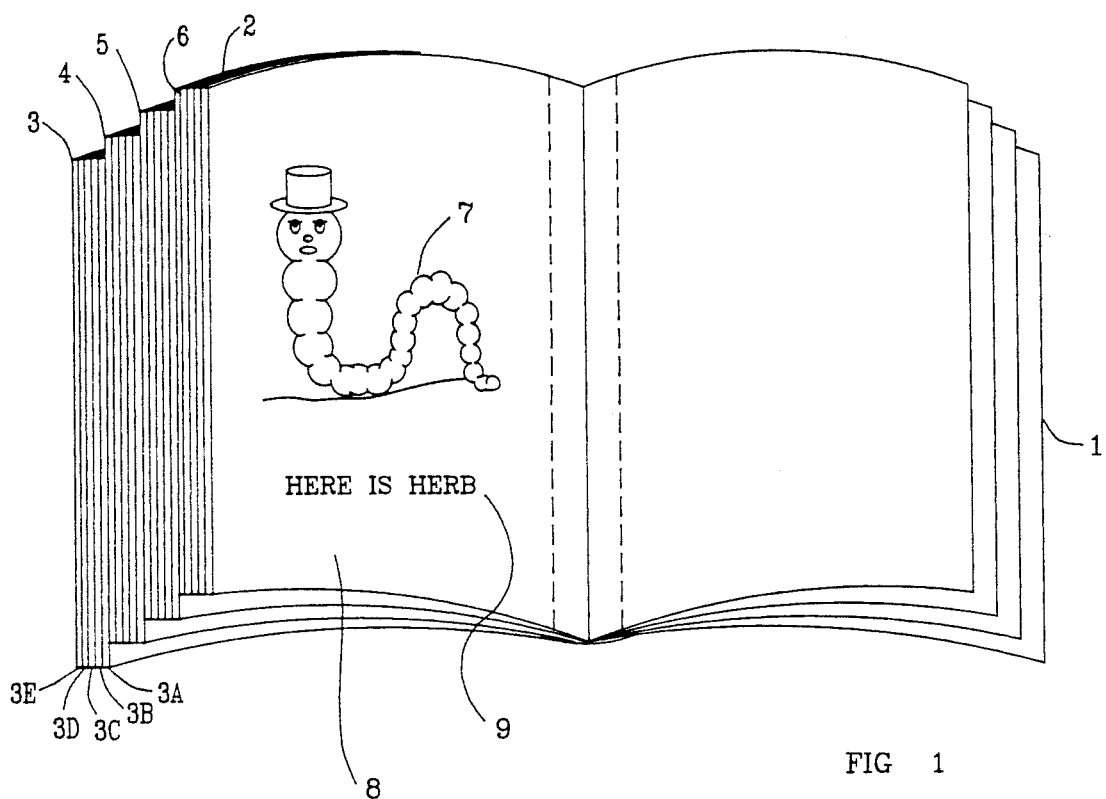
FIG. 1 is a perspective view of the creative writing book according to the present invention.

As shown in FIGS. 1-8, the present invention includes a book to teach and encourage writing skills, having a picture pad 2 having a plurality of pages 3, 4, 5, 6, etc., each page having an identical picture 7 thereon, and each page having no text upon it. Each page further has a blank space 8 for a user to inscribe creative text to imaginatively explain and give meaning to the picture 7 thereon.

Alternatively, a picture page may be adjacent to a blank writing page next to the picture page, so that the user writes on the adjacent blank page, instead of upon blank space 8 of each page 3, 4, 5, 6 etc.

The pages 3, 4, 5, 6, etc. each include a bundle of page leaves with identical pictures on each page leaf of a plurality of page leaves in a page bundle, such as identified by reference numeral 3.

For example, page bundle 3 includes a succession of identical pictures on page leaves 3A, 3B, 3C, 3D, 3E, etc. Each of the page leaves 3A, 3B, 3C, 3D, 3E, etc. are capable of being torn off from the pad 2 to permit a user to inscribe differing text 9 on a succession of page leaves 3A, 3B, 3C, 3D, 3E, etc., which all have identical pictures within one page bundle, such as 3.

The differing pictorial inscriptions for other page bundles, such as page bundle 4, having leaves 4A-4E, etc., and page bundles 5, having leaves 5A-5E, etc., permit the user to practice and improve creative writing skills by varying and expanding upon previously inscribed text. The page leaf sheets which have been written upon and then torn-off from the picture pad constitute a portfolio of the user's educational progress, wherein a plurality of pictures are provided upon the pages.

As noted above, the book may include a plurality of page bundles. The respective page bundles each further include a plurality of pages 3A, 3B, 3C, 3D, 3E wherein the page leaves 3A, 3B, 3C, 3D, 3E in each page bundle 3 bear an identical picture 7 without text, and wherein each respective page bundle bears a unique picture not found in any other page bundle.

The pages may be a pad 2, with the first written story being made of upper page leaves 3A, 4A, 5A, 6A etc. of page bundles 3, 4, 5, 6 etc. being capable of being torn off from the pad 2 to permit a user to inscribe differing text on a succession of lower page leaves 3B, 4A, 4A, 6A, etc., which also all have identical pictures. The differing pictorial inscriptions 7 on the lower successive page leaves 3B, 4B, 5B, 5C etc., permit the user to practice and improve creative writing skills by varying and expanding upon the previously inscribed text written on torn off original upper page leaves 3A, 4A, 5A, 6A etc.

In another embodiment, the book 1 may have more than one story, so that one first story may be associated with page bundles 3, 4, 5, 6 etc., and a subsequent story may be found in another set of pages (not shown) underneath the first group of pages, so that the book volume may have a compendium of multiple short stories.

Figure 2:
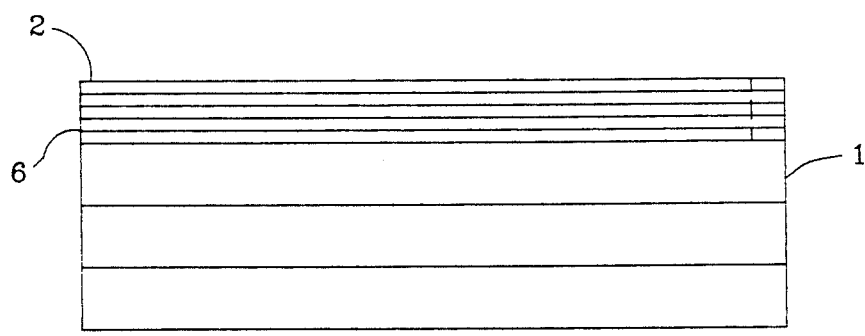
FIG. 2 is a side elevational view of several of the pages of the book as in FIG. 1, showing one of the pages with multiple leaves.
Figure 2A:
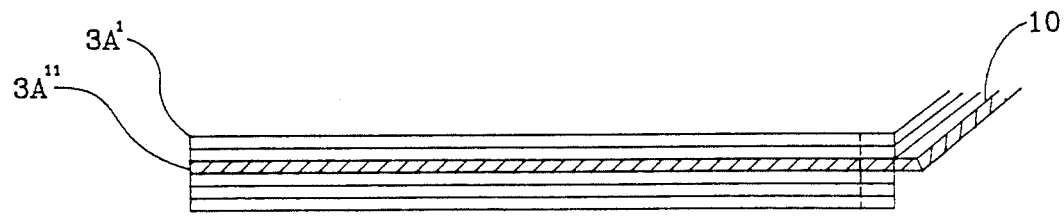
FIG. 2A is a close-up perspective view of a multi-leaf page with pressure sensitive paper, wherein a stiff flat insert is inserted between two leaves.

In an alternate embodiment as shown in FIG. 2A, the picture pad may have a plurality of double-leaf pages. Each respective double-leaf page includes a top leaf 3A' and a bottom leaf 3A''. The double leaf page is a pressure sensitive writing surface capable of producing an image 7 on the bottom leaf 3A'' in response to the pressure of a writing instrument being applied to the top leaf 3A'. The double leaf pages 3A' and 3A'' bear an identical picture 7 in positional register on the top leaf 3A and on the bottom leaf 3A''. The top and bottom leaf 3A' and 3A'' have no text. The top leaf 3A' and the bottom leaf 3A'' further have space 8 for a user to inscribe creative text 9 to imaginatively explain and give meaning to the picture 7 thereon.

The upper page leaf 3A' is capable of being torn off from page 3 of the pad 2 to permit a user to display the inscribed text from upper page leaf 3A' imprinted upon pressure sensitive to lower page leaf 3A'' having the identical picture thereon. The upper page leaf sheets 3A' which have been written upon and then torn-off from the picture pad display a portfolio of the user's educational progress.

When the pressure sensitive pages 3A' and 3A'' are used, the user may have a stiff flat insert 10 for placing underneath the pad page 3A'' to be written on, for preventing successive lower pressure sensitive pad pages 4A'', 5A'', 6A'', etc. from being inadvertently spoiled by a user's writing pressure. The stiff flat insert is capable of preventing user writing pressure from inadvertently spoiling lower pressure sensitive page leaves below the page leaf being written upon.

Figure 3:
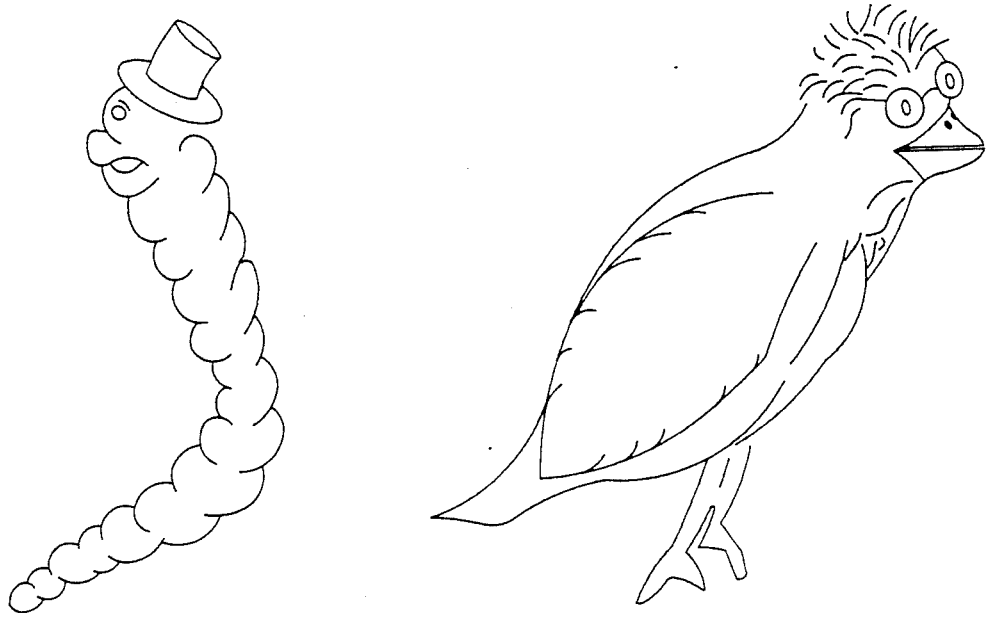
FIGS. 3-8 depict typical word-less pictorial storyline of the book as in FIG. 1.
Figure 3:
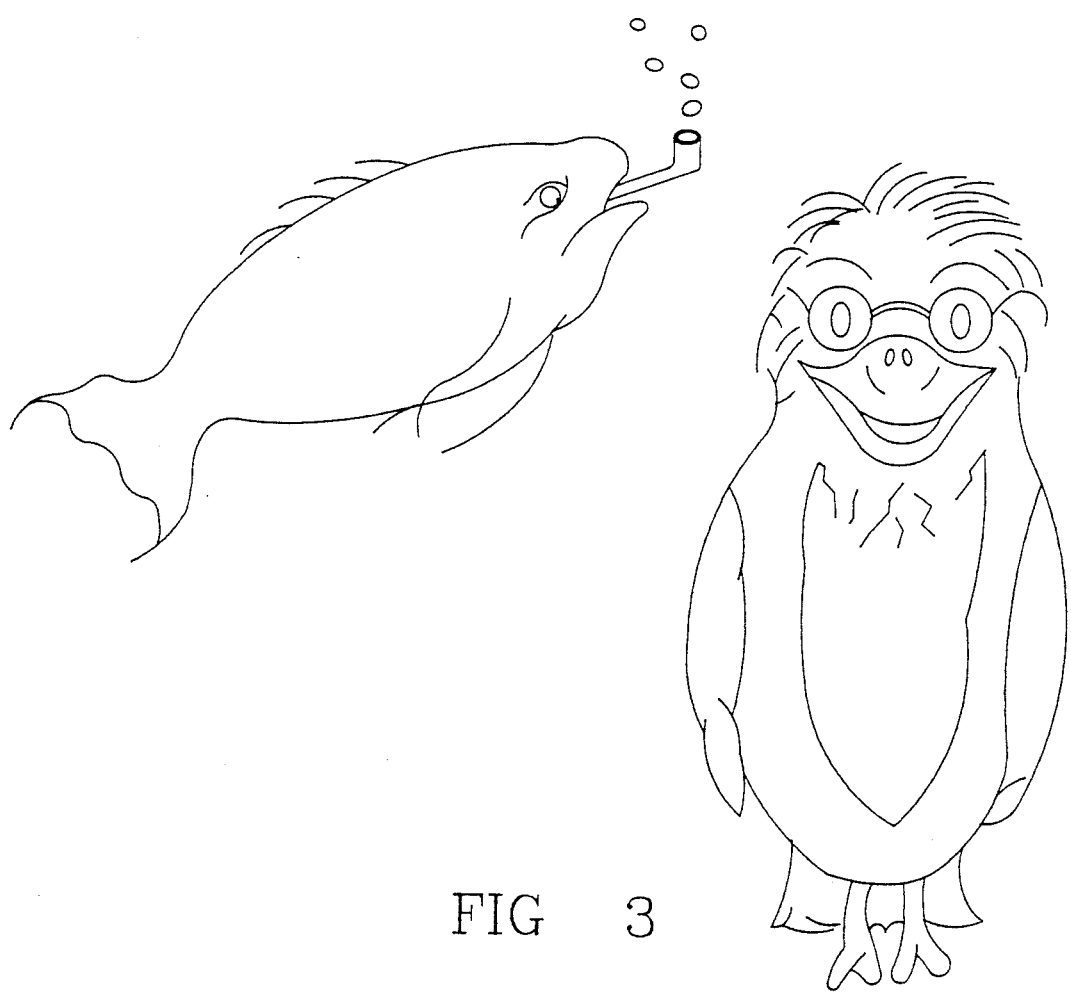
Figure 4:
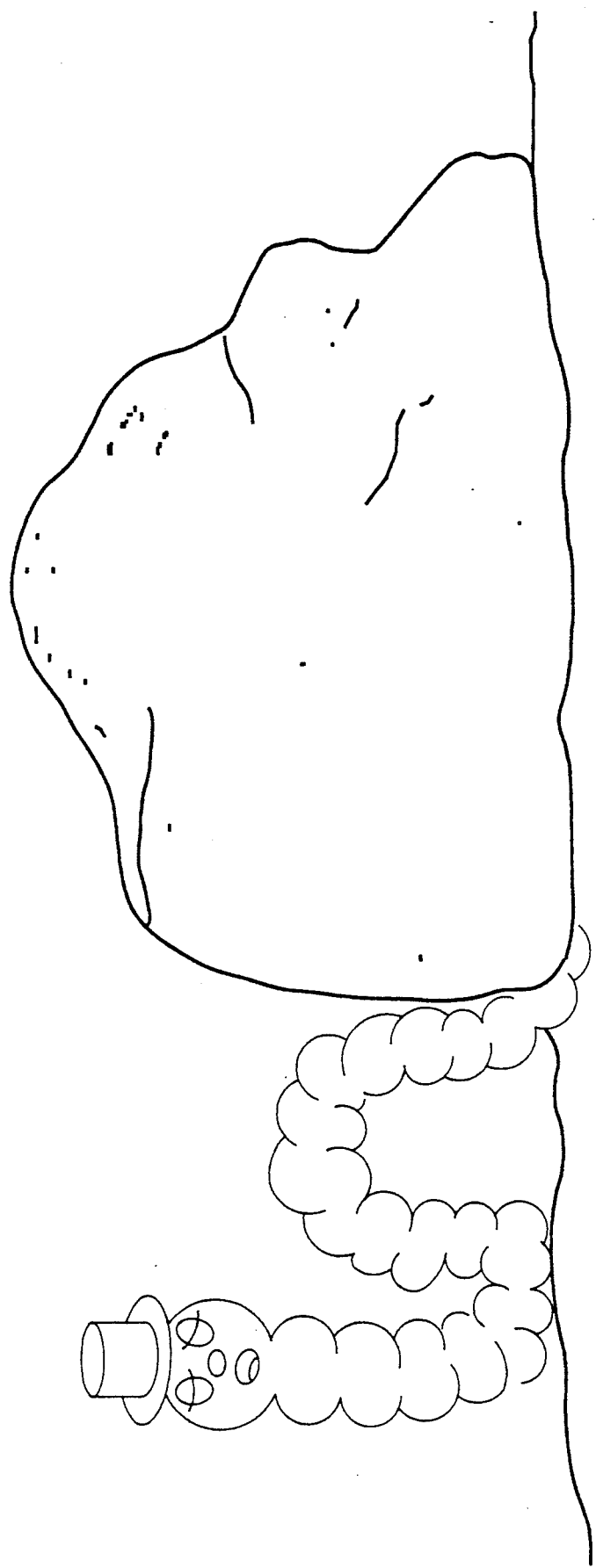
Figure 5:
Figure 6:
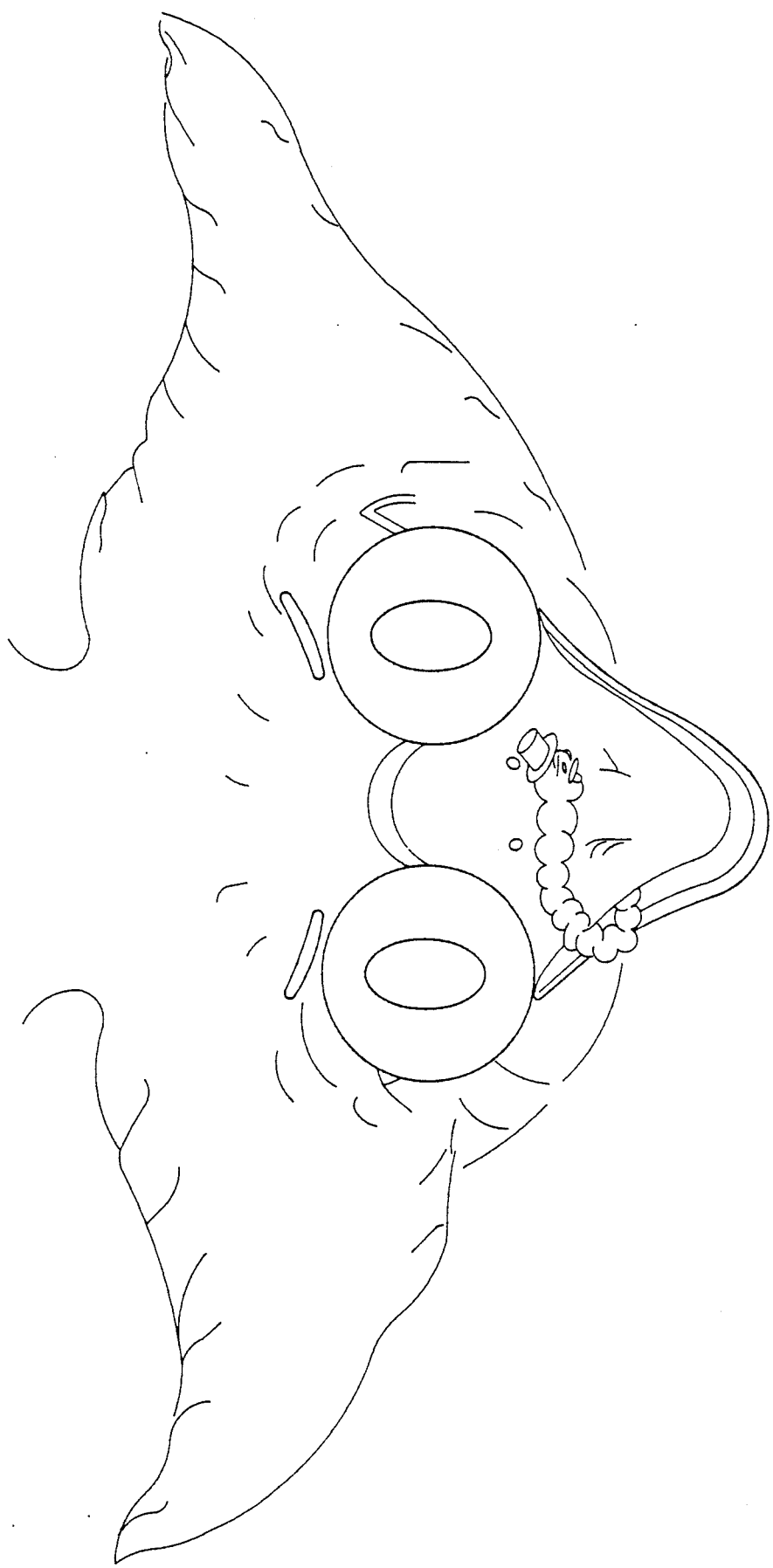
Figure 7:
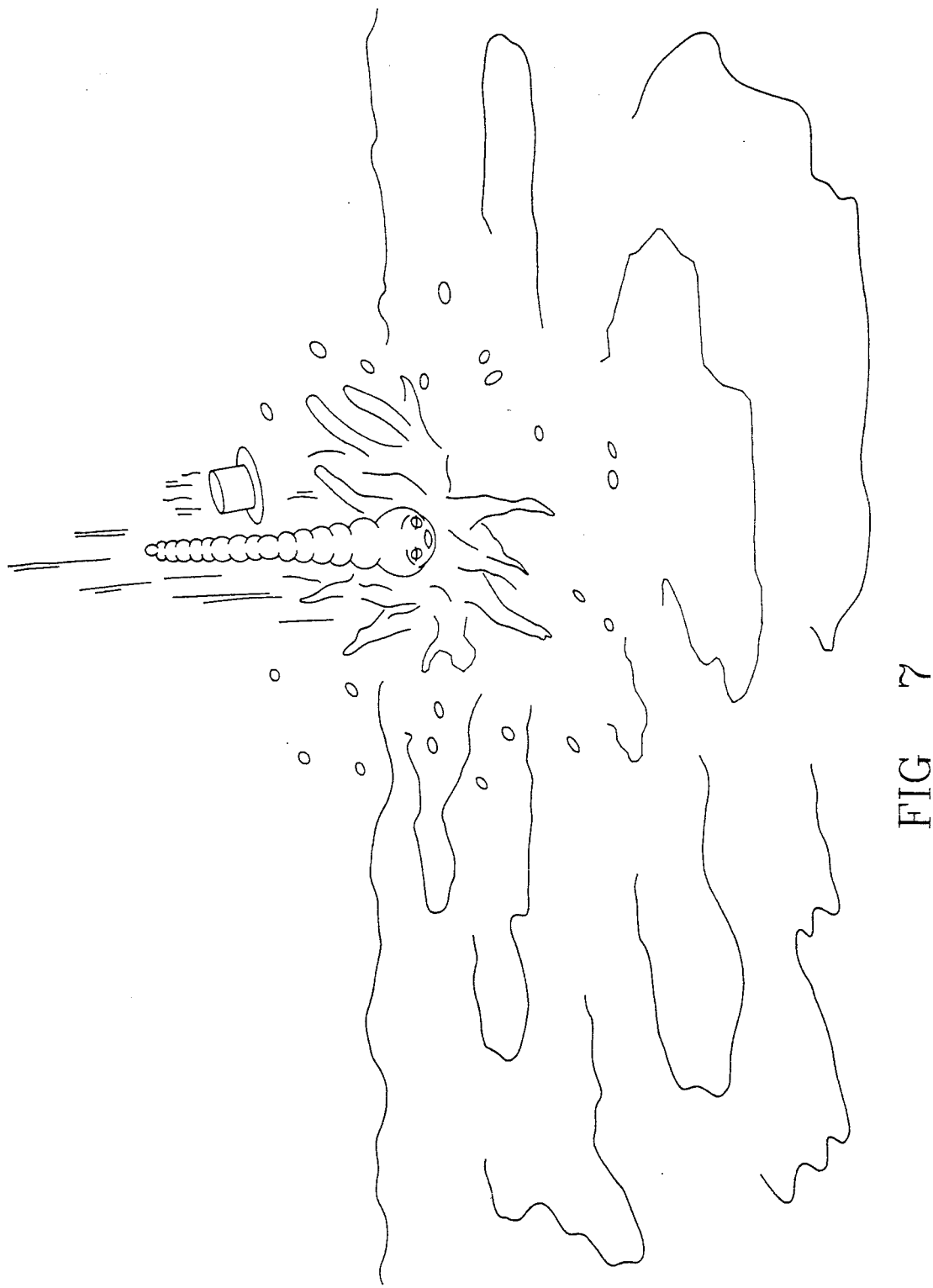
Figure 8:
Figure 9:
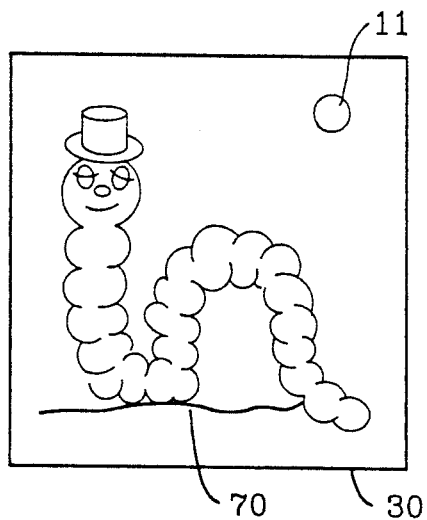
FIGS. 9-9B show an alternative embodiment wherein the pages of the book bear sequential indicia of geometric graphic symbols.
Figure 9A:
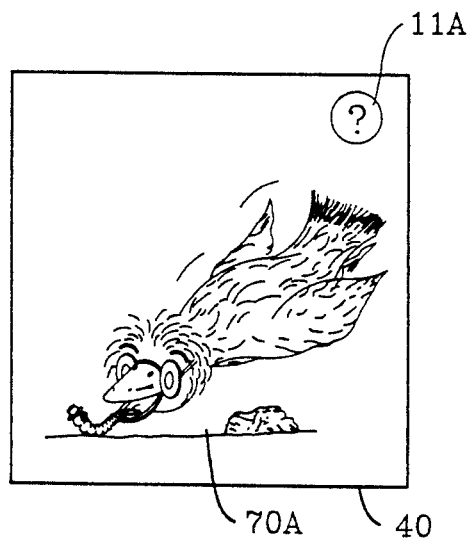

FIGS. 3-8 present a typical story including an introduction of characters as in FIGS. 3 and 4, a first conflict situation in FIG. 5, a complication as in FIG. 6, a fortuitous escape as in FIG. 7 and a conclusion as in FIG. 9. The stories may have a variety of happy or unhappy endings.

Figure 9B:
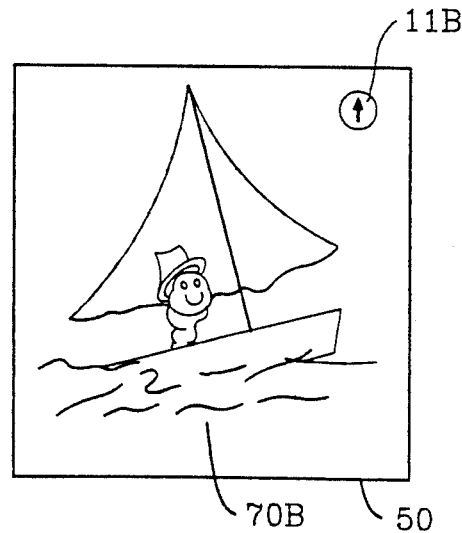

Alternatively, as shown in FIGS. 9-9B, each picture in the story sequence may be also provided with sequential indicator symbols. The symbols 11, 11A, 11B, etc. appear on respective picture page bundles 30, 40, 50, wherein respective individual indicator symbols 11, 11A, 11B, are associated with particular pictures 70, 70A, 70B in a story sequence. The respective indicator symbols vary in sequence with the story picture sequence, for indicating to the user the relative position in the story of the picture 70 with which the symbol 11 is associated.

The sequential indicator symbols 11, 11A, 11B may be geometric shapes such as circles. The geometric shapes grow in size, the smallest geometric shape 11 appearing on the first picture 70 in the picture story sequence and the largest geometric shape 11B appearing on the last picture 70B in the picture story sequence.

Figure 10:
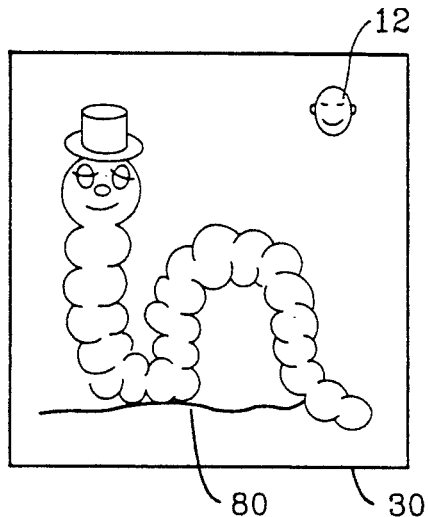
FIGS. 10-10B show a further alternate embodiment wherein the pages of the book bear sequential indicia of graphic character symbols.
Figure 10A:
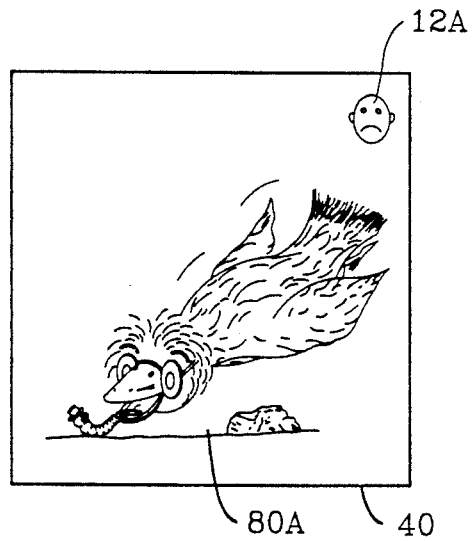
Figure 10B:
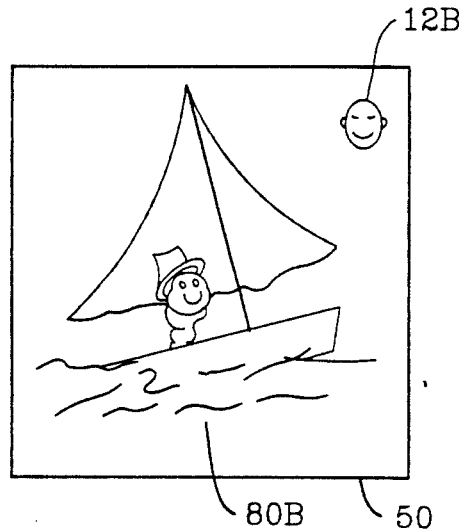

As shown in FIGS. 10-10B, in another embodiment, the sequential indicator symbols may be fanciful characters 12, 12A, 12B etc. The fanciful characters grow in size, such that the smallest fanciful character 12 appears on the first picture 80 in the picture story sequence and the largest fanciful character 12B appears on the last picture 80B in the picture story sequence.

Figure 11:
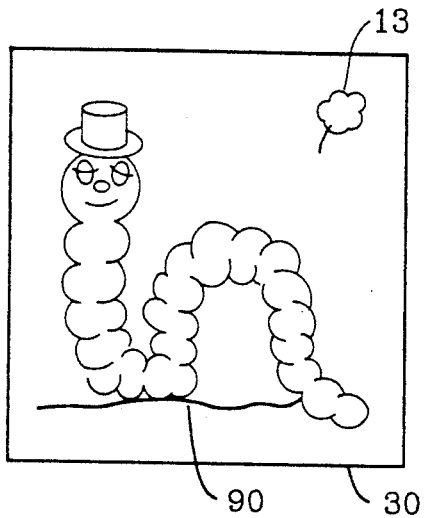
FIGS. 11-11B show a further alternate embodiment wherein the pages of the book bear sequential indicia of fanciful theramatic shaped indicia of graphic symbols.
Figure 11A:
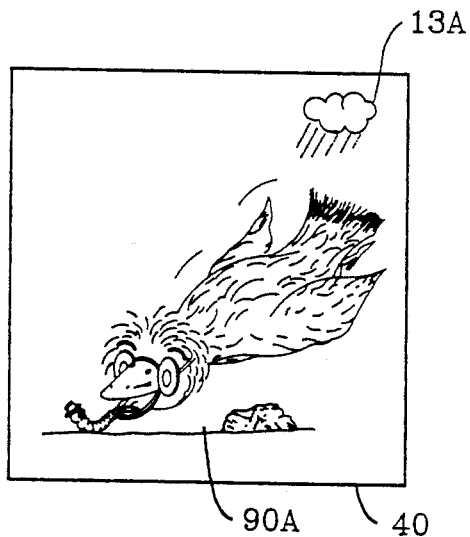
Figure 11B:
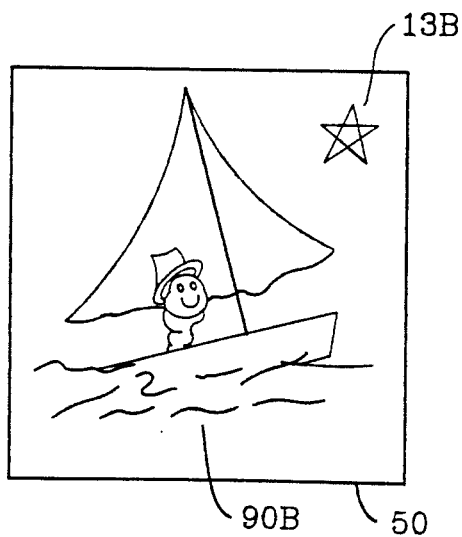

In a further embodiment as shown in FIGS. 11-11B, the sequential indicator symbols may be fanciful shapes 13, 13A, 13B wherein the fanciful shapes grow in size. The smallest fanciful shape 13 appears on the first picture 90, in the picture story sequence and the largest fanciful shape 13B appears on the last picture 90B in the picture story sequence.

The symbols may be related to a story sequence, such as wherein introductory symbol 13 is a small flower, intermediate sized symbol 13A represents a rainy cloud to indicated a change in events, and large sized symbol 13B represents a star to indicate a conclusion. Therefore, the sequential indicators 13, 13A, 13B, by their very shape as appearing on respective picture pages, help a child user to associate a particular symbol with a particular eventful situation in a story sequence. The respective indicator symbols vary in sequence with the story picture sequence, for indicating to the user the relative position in the story of the picture with which the symbol is associated.

In summary, a creative writing book is provided wherein participants are given a book with a title page in which they fill in and sign as the author, then there are pictures of the primary characters in which they name and can write a brief description of their personality. There are pages with sequential pictures of characters interacting an adventure. The user writes his or her interpretation of what is going on with any dialogue necessary. Then the user goes on to a next page leaf and so on, or writes a continuous story. The user must resolve any conflicts their character may encounter showing creativity and imagination. When the user gets to the last page, the user must write the ultimate conclusion, preferably with a moral or valuable lesson to be learned. When completed, the user then transcribes the story on removable pages located at the back of the book, brings or mails them to a processing office where they are evaluated in different categories, i.e., creativity, moral, use of language, detail, excitement, etc. Then a cut off date may be announced. The users may be be notified by mail of their standing in the group. Those at the top of the list may be offered prizes. Their story may be hard bound, and a savings bond, etc. may be provided.

The present invention is not limited to the foregoing description and drawings, as various modifications may be made therefrom, without departing from the spirit and scope of the invention as noted in the appended claims.

I claim:

1. A book to teach and encourage writing skills, comprising:
   a picture pad having a plurality of double-leaf pages, each respective double-leaf page comprising a plurality of leaves, said plurality of leaves includes a first separable leaf and a second permanently attachable leaf, wherein one leaf of said plurality of leaves is a top leaf and another leaf of said plurality of leaves is a bottom leaf, each said double leaf page comprising a pressure sensitive writing surface capable of producing an image on said bottom leaf in response to the pressure of a writing instruction being applied to said top leaf; and further wherein said double leaf pages bear at least one identical picture in register on said top leaf and on said bottom leaf, said top and bottom leaf having no text; and said top leaf and said bottom leaf further having space for a user to inscribe creative test to imaginatively explain and give meaning to the picture thereon;
   said pad pages being capable of being torn off from said pad to permit a user to inscribe differing text from page to page on a succession of pages which all have identical pictures, the differing inscriptions for permitting the user to practice and improve creative writing skills by varying and expanding upon previously inscribed text and said leaves which have been written upon and then torn-off from said picture pad comprising a portfolio of the user's educational progress;
   said book having a stiff flat insert for placing underneath a pad page to be written on, for preventing successive pressure sensitive pad pages from being inadvertently spoiled by a user's writing pressure, said stiff flat insert being capable of preventing user writing pressure from inadvertently spoiling pressure sensitive pad pages below the one pad page being written upon;
   wherein said top leaf and said bottom leaf are capable of being separated, and further;
   wherein one leaf of said plurality of leaves of each said double-leaf pages is permanently attached to the picture pad, and further where the other leaf of said plurality of leaves of each said double-leaf pages is removable from the picture pad for keeping a separate record of the user's inscribed text.

2. The book of claim 1 wherein a plurality of pictures are provided upon each of the pages.

3. The book of claim 1 wherein the bottom leaf is permanently attached to said picture pad, and further where said top leaf is removable from said picture pad for keeping a separate record of the user's inscribed text.

4. A book as in claim 1, each page having a different picture thereon, further where said pictures on successive pages are related in a story sequence, said picture sequence comprising a story without text, each said page further having blank space for a user to inscribe creative text to imaginatively explain and give meaning to said picture thereon.

5. A book as in claim 1, wherein each said picture in said story sequence is provided with sequential indicator symbols, said symbols appearing on respective said picture pages, wherein respective said individual indicator symbols are associated with particular pictures in a story sequence, and further, wherein said respective indicator symbols vary in sequence with said story picture sequence, for indicating to the user the relative position in the story of said picture with which said symbol indicators is associated.

6. A book as in claim 5, wherein said sequential indicator symbols are geometric shapes, and further, wherein said geometric shapes grow in size, a smallest geometric shape appearing on a first picture in said picture story sequence and a largest geometric shape appearing on a last picture in said picture story sequence.

7. A book as in claim 5, wherein said sequential indicator symbols are circles, and further, wherein said circles grow in size, said smallest circle appearing on said first picture in said picture story sequence and said largest circle appearing on said last picture in said picture story sequence.

8. A book as in claim 5, wherein said sequential indicator symbols are fanciful shapes, and further, wherein said fanciful shapes grow in size, said smallest fanciful shape appearing on said first picture in said picture story sequence and said largest fanciful shape appearing on said last picture in said picture story sequence.

9. A book as in claim 5, wherein said sequential indicator symbols are fanciful characters, and further, wherein said fanciful characters grow in size, said smallest fanciful character appearing on said first picture in said picture story sequence and a largest fanciful character appearing on said last picture in said picture story sequence.

10. A book as in claim 1, wherein a first group of said pages includes one first pictorial series of pictures in a story, and at least one subsequent group of pictures constitutes at least one additional pictorial series of pictures in at least one additional story, said subsequent group of pages located beneath said first group of pages.

11. The book as in claim 1, wherein said book includes a plurality of pages with at least one picture thereon, each said page having at least one picture with no text, said at least one page being adjacent to a blank bundle of page leaves for inscription of writing thereon.

12. The book of claim 1, wherein the top leaf is permanently attached to the picture pad, and further the bottom leaf is removable from the picture pad for keeping a separate record of the user's inscribed text.

* * * * *